United States Patent
Estipona

(10) Patent No.: US 7,284,257 B1
(45) Date of Patent: Oct. 16, 2007

(54) ANNOUNCING THE AVAILABILITY OF AN ELECTRONIC PROGRAMMING GUIDE TO RECEIVERS OF ENHANCED TELEVISION TRANSMISSIONS

(75) Inventor: Jim B. Estipona, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1464 days.

(21) Appl. No.: 09/652,695

(22) Filed: Aug. 31, 2000

(51) Int. Cl.
*H04N 5/445* (2006.01)

(52) U.S. Cl. .................. 725/50; 725/32; 725/51; 725/39; 725/43; 725/44; 725/48; 725/49; 725/54

(58) Field of Classification Search ............ 725/37–61, 725/32
See application file for complete search history.

(56) References Cited

U.S. PATENT DOCUMENTS 6,405,372 B1 * 6/2002 Kim et al. ................... 725/50
6,522,342 B1 * 2/2003 Gagnon et al. ............. 345/716
2005/0055640 A1 * 3/2005 Alten ......................... 715/719

OTHER PUBLICATIONS

M. Handley et al, Apr. 1998, Network Working Group, RFC 2327 "SDP: Session Description Protocol", pp. 6-15.*
David L. Mills, Mar. 1992, Network Working Group, RFC 1305, Network Time Protocol, Version 3.*
"Advanced Television Enhancement Forum Specification (ATVEF)", Draft, Version 1.1r26 updated Feb. 2, 1999.
Estipona, Jim B., "Time Shifting Enhanced Television Triggers", U.S. Appl. No. 09/652,413, filed Aug. 31, 2000.
Estipona, Jim B., "Mapping Enhancements to Network Identifiers", U.S. Appl. No. 09/652,692, filed Aug. 31, 2000.

* cited by examiner

*Primary Examiner*—Jason P. Salce
(74) *Attorney, Agent, or Firm*—Trop, Pruner & Hu, P.C.

(57) ABSTRACT

A unique session identifier may be utilized to announce the availability of an electronic programming guide to users of an enhanced television distribution system. In some embodiments, the unique session identifier may be utilized in a variety of systems to provide a uniform way of recognizing the availability of an electronic programming guide in conjunction with enhanced television distribution systems.

25 Claims, 3 Drawing Sheets

ANNOUNCING THE AVAILABILITY OF AN ELECTRONIC PROGRAMMING GUIDE TO RECEIVERS OF ENHANCED TELEVISION TRANSMISSIONS

BACKGROUND

This invention relates generally to interactive or enhanced television content.

Interactive or enhanced television content generally involves the distribution of television programming accompanied by additional content. The additional content, sometimes called an enhancement, may be accessed within the broadcast stream or at a remote location, for example over the Internet. The additional content may be described as a resource that may be accessed through a trigger broadcast with the enhanced television content. In an enhanced television distribution system, announcements are used to announce currently available programming to the receiver. Having received the announcement, a receiver may listen to a specified port and address to obtain the announced information.

An electronic programming guide (EPG) is content that is used to determine the programming related information available on a current connection. A current connection may be an analog or digital video distribution source. As examples, a connection may include a cable connection, a broadcast connection or a satellite connection. An electronic programming guide may be in the form of a graphical user interface or presentation files that indicate a channel-to-programming map or channel map. The guide enables the user to determine what programs are available on what channels.

In enhanced television distribution schemes, an electronic programming guide may be distributed through the television content distribution system. An electronic programming guide may actually be distributed to a plurality of receivers or at least the electronic programming guide may be sufficiently identified through the broadcast data to enable it to be accessed by the receiver.

Conventionally, the distribution of an electronic programming guide is indicated in different ways in different television distribution systems. For example, Broadcast Plus may utilize announcements with a required field a=cid: XXXX. Other entities send such announcements without the required Broadcast Plus format. Thus, Broadcast Plus can not receive the enhancements based for example on the client tool kit distributed by Intel Corporation. Similarly, WebTV® based content (from Microsoft Corporation) announces the availability of various resources in different ways. Thus, there is no uniform way to announce the availability of an electronic programming guide that is recognized by all the available system/software providers.

Therefore, there is a need for a way to enable receivers to determine that an electronic programming guide is available regardless of the hardware or software utilized.

DETAILED DESCRIPTION

Figure 1:
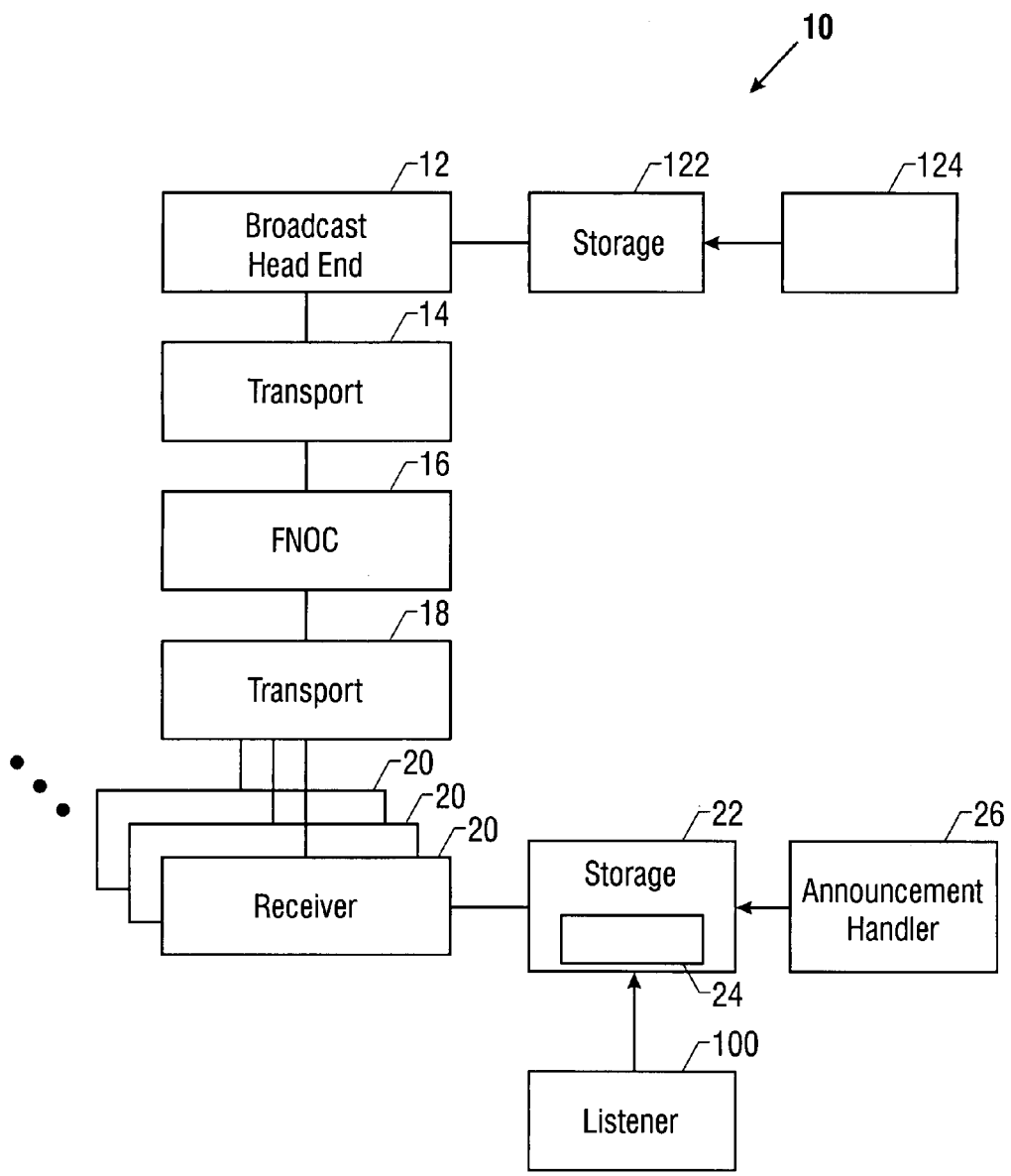
FIG. 1 is a schematic depiction of one embodiment of the present invention.

Referring to FIG. 1, an enhanced television content distribution system 10 may include a broadcast head end 12 that distributes the enhanced television content. The head end 12 distributes the content over a transport 14. The transport 14 may include a cable, airwave, or satellite distribution system, as examples.

In some embodiments, the broadcast head end 12 may distribute the content directly to receivers which do not thereafter rebroadcast the content but rather, make the content available for viewing on the receiver itself. In other cases, the content may be rebroadcast by a rebroadcaster or network operating center (NOC). Thus, as illustrated in FIG. 1, an NOC 16 may be coupled to the head end 12 by a transport 14. Similarly, the NOC 16 may be coupled to a plurality of receivers 20 by a transport 18. The transports 14 and 18 may utilize different technologies.

Each receiver 20 may include a storage device 22 that stores software including an announcement handler 26 and an EPG listener 100. The announcement handler 26 listens for announcements in the distributed content and provides an indication for that announcement to the receiver 20. For example, information about available enhancements may be displayed on a monitor or television associated with the receiver 20. In addition, the storage 22 may include a cache 24. The cache 24 may be utilized to cache enhancements, such as an EPG, that are identified by the announcement handler 26, in some embodiments of the present invention.

Figure 2:
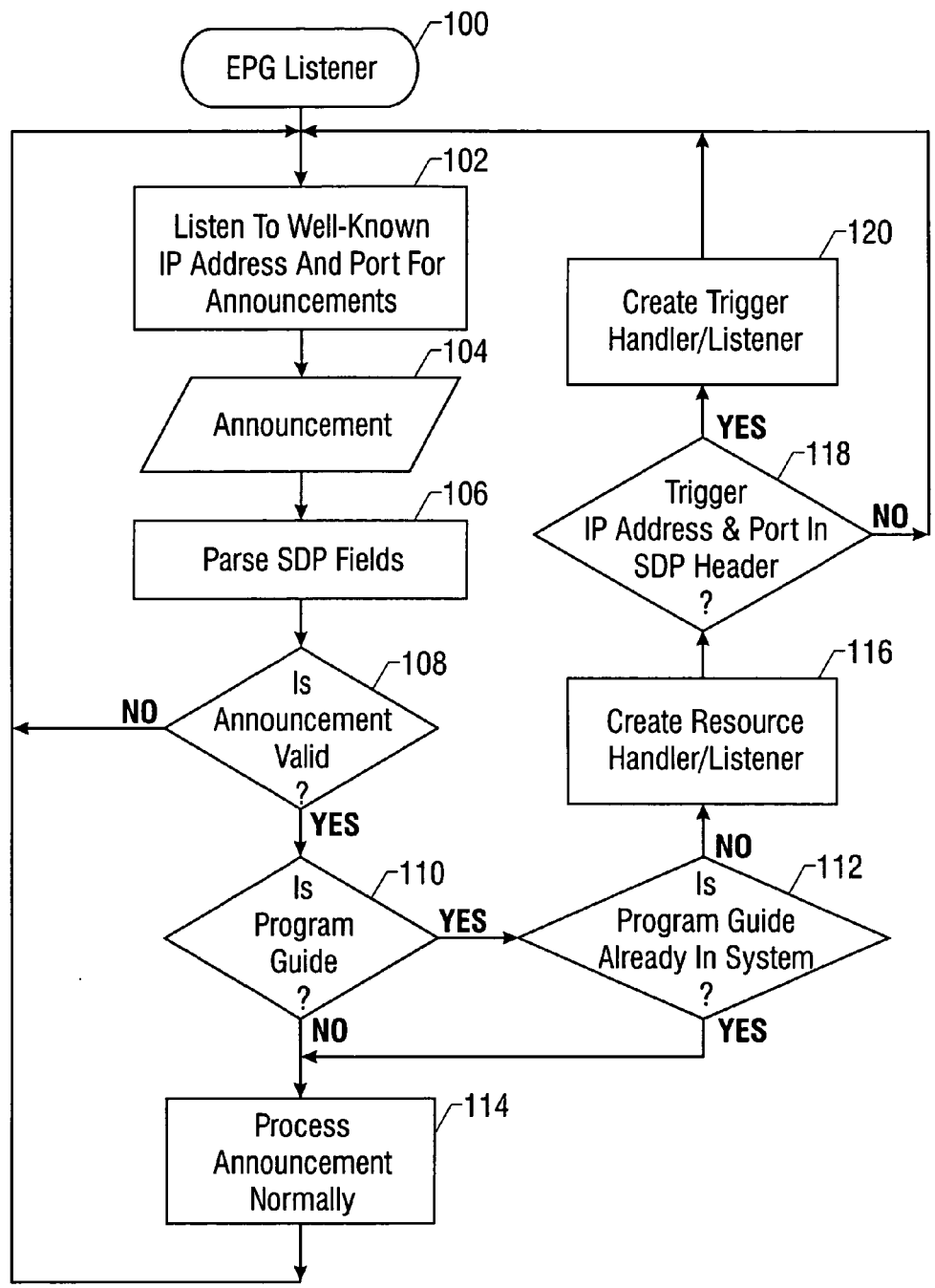
FIG. 2 is a flow chart for software in accordance with one embodiment of the present invention.

The announcement handler software 26, shown in FIG. 1, begins by listening to well known Internet Protocol (IP) address and port for announcements as indicated at block 102 of FIG. 2. That is, the receiver 20 is aware of established ports and addresses for announcements. The distribution of enhanced television content is well established and may be implemented in accordance with known protocols.

One such protocol is the Advanced Television Enhancement Form (ATVEF) Specification, Draft Version 1.1 r.26, updated Feb. 2, 1999. That specification includes standards for announcements and provides a specific announcement protocol. For example, announcements may be implemented in accordance with the session description protocol (SDP) promulgated by the Network Working Group and published as Request for Comments (RFC) 2327 dated April 1998. The IP multicast addresses and ports for resource transfers are announced using SDP announcements. Announcements may be sent on a well known address (224.0.1.113) and port (2670) pursuant to the ATVEF specification.

The ATVEF announcement protocol sets forth a well established SDP header format. That format includes a session description including a protocol version, an owner/creator and session identifier, a session name, and additional information set forth for example in the ATVEF specification. The owner/creator and session identifier field specifies a user name, session identifier (sid) and version followed by an IP address, as set forth in the ATVEF specification. The session identifier is a Network Time Protocol (NTP) value as identified in the NTP Version 3 Specification, published by D. Mills as RFC 1305 on March 1992. The UNIX time is basically an offset value to the NTP value. The next field in the announcement protocol is the session name which is a required field. It is specified by the variable s equals the appropriate name.

In accordance with one embodiment of the present invention, the session identifier or sid is specified to be equal to the UNIX zero time value (which necessarily otherwise would never be utilized). The UNIX zero time value is equivalent to the NTP value 2208988800. Thus, the announcement protocol may specify a sid equal to 2208988800. The session name may be specified as "program guide" or s equals program guide. In this way, a well established session identifier and session name may be utilized by all broadcasting entities. This protocol enables an electronic programming guide to be readily identified in any format or system. In addition, by providing the session name "program guide" in the announcement protocol, a user viewable list or display box may be displayed to advise the user of the availability of a program guide.

Thus, an example of a hypothetical announcement protocol, compliant with the ATVEF specification, in accordance with one embodiment of the present invention, is as follows:

```
v =     0
o =     -2208988800 2890844526 IN IP4
        tve.niceBroadcaster.com
s =     program guide
e =     help@niceBroadcaster.com
a =     UUID:f81d4fae-7dec-11do-a765-00a0c91e6bf6
a =     type:tve
a =     tve-level:1.0
t =     2873397496 O
a =     tve-ends:30000
a =     tve-type:primary
m =     data 52127/2 tve-file/tve-trigger
c =     IN IP4 224.0.1.112/127
b =     CT:100
a =     tve-size:1024
m =     data 52127/2 tve-file/tve-trigger
c =     IN IP4 224.0.0.1/127
b =     CT:1024
a =     tve-size:4096
```

Thus, the second line, second variable specifies a program guide by the use of a unique number corresponding to the UNIX zero value. The third line specifies a session name "program guide" which may be extracted and displayed in a human readable format.

Returning to FIG. 2, an announcement may be detected as indicated at 104 by the announcement handler 26. When an announcement is detected, the header's SDP fields are parsed as indicated in block 106. If the announcement is valid, as determined at diamond 108, a check at diamond 110 determines whether a program guide is announced. The determination of whether an electronic programming guide is being announced is based on the number in the session identifier (sid) field.

If an electronic programming guide has been announced, a check at diamond 112 determines whether the electronic programming guide is already cached in the cache 24. If so, or if the announcement does not relate to an electronic programming guide, the announcement is processed normally as indicated in block 114. In the case where the electronic programming guide is not already stored in the cache 24, a resource handler/listener may be created as indicated in block 116. A trigger Internet Protocol address and port number contained in the SDP header may be identified at diamond 118. If so, a trigger handler listener may be developed (block 120). Otherwise, the software simply iterates, having received the appropriate announcements.

Embodiments of the present invention do not require a back channel or uplink to acquire the electronic programming guide. Avoiding the need for an uplink to acquire the electronic programming guide may make the receiver more robust to network or modem failures, geographical difficulties/differences and may also lower the initial cost of ownership of the receiver while reducing the uplink channel subscription cost as well. In addition, a fully ATVEF-compliant announcement needs no special session attribute in the SDP header to ensure that the announcement will be recognized by ATVEF-compliant receivers. Moreover, no optional field is needed in the ATVEF SDP header for the EPG announcement. In addition, a special channel for the electronic programming guide is not needed but instead may be accessed as any type of enhancement may be accessed in an enhanced television broadcast.

As shown in FIG. 1, the head end 12 may also include a storage 122. The head end may include a processor-based system which is capable of executing software such as the software 124 stored on the storage 122.

Figure 3:
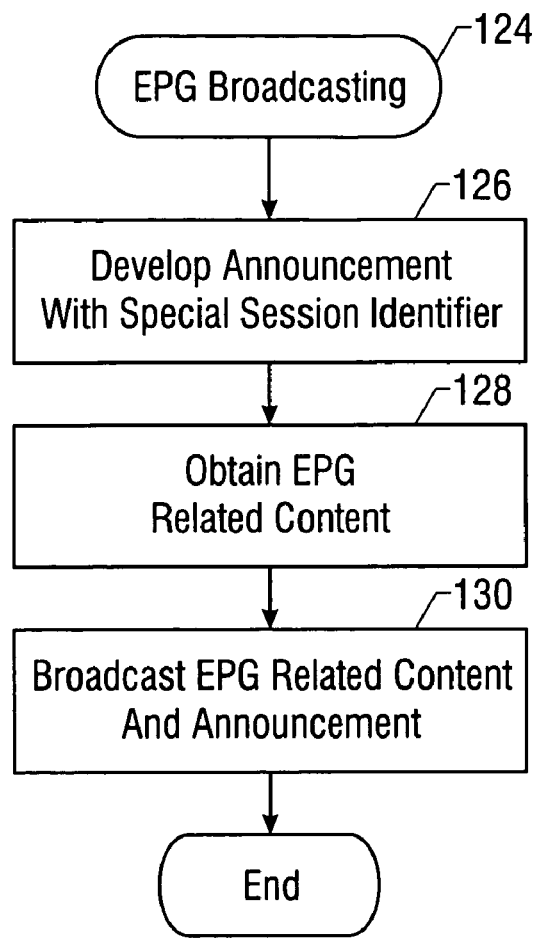
FIG. 3 is a flow chart for software in accordance with another embodiment of the present invention.

Referring to FIG. 3, the software 124 facilitates the distribution of enhanced television content that identifies an electronic programming guide for the enhanced content. Initially, an announcement is developed with the special session identifier and session name described previously and as indicated in block 126. The electronic programming guide related content is then obtained as indicated in block 128. The electronic programming guide related content and the announcement may be broadcast at the same or different times as indicated in block 130.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   transmitting enhanced television content; and
   transmitting an announcement for said enhanced television content, said announcement including a session identifier having a value announcing the availability of an electronic programming guide for said enhanced television content.

2. The method of claim 1 wherein transmitting an announcement includes transmitting the announcement in a session description protocol.

3. The method of claim 2 wherein transmitting an announcement includes transmitting a unique session identifier which identifies an electronic programming guide.

4. The method of claim 3 including transmitting a session identifier which is a unique number.

5. The method of claim 4 wherein transmitting a session identifier includes transmitting the number 2208988800.

6. The method of claim 1 including transmitting a session name.

7. The method of claim 6 wherein transmitting a session name includes transmitting a human readable session name indicative of an electronic programming guide.

8. A computer readable medium storing instructions that, when executed, enable a processor-based system to:
   transmit enhanced television content; and
   transmit an announcement for said enhanced television content, said announcement including a session identifier having a value announcing the availability of an electronic programming guide for said enhanced television content.

9. The computer readable medium of claim 8 further storing instructions that enable the processor-based system to transmit the announcement in a session description protocol.

10. The computer readable medium of claim 9 further storing instructions that enable the processor-based system to transmit a unique session identifier that identifies an electronic programming guide.

11. The computer readable medium of claim 10 further storing instructions that enable the processor-based system to transmit a session identifier that is a unique number.

12. The computer readable medium of claim 11 further storing instructions that enable the processor-based system to transmit the number 2208988800.

13. The computer readable medium of claim 8 further storing instructions that enable the processor-based system to transmit a human readable session name indicative of an electronic programming guide.

14. A system comprising:
a processor-based transmitter; and
a storage, coupled to said processor-based transmitter, said storage storing instructions that enable enhanced television content and an announcement for said enhanced television content to be transmitted, said announcement including a session identifier having a value announcing the availability of an electronic programming guide for said enhanced content.

15. The system of claim 14 wherein said storage further stores instructions that enable the device to transmit a session identifier that is a unique number.

16. The system of claim 15 wherein said storage stores instructions that enable the device to transmit the number 2208988800.

17. A method comprising:
enabling a receiver to receive enhanced television content; and
enabling the extraction from said content of an announcement for said enhanced television content, said announcement including a session identifier having a value announcing the availability of an electronic programming guide.

18. The method of claim 17 including determining whether the enhanced television content includes an electronic programming guide.

19. The method of claim 18 including determining whether an electronic programming guide has already been cached.

20. The method of claim 19 including processing the announcement without regard for the electronic programming guide if the programming guide is already cached.

21. A computer readable medium storing instructions that enable a processor-based system to:
enable a receiver to receive enhanced television content; and
enable the extraction from said content of an announcement for said enhanced television content, said announcement including a session identifier having a value announcing the availability of an electronic programming guide.

22. The medium of claim 21 further including instructions that enable the processor-based system to determine whether the enhanced television content includes a programming guide.

23. The medium of claim 22 further storing instructions that enable the processor-based system to determine whether the electronic programming guide has already been cached and if so, process the announcement without regard to the electronic programming guide.

24. A system comprising:
a processor-based receiver; and
a storage coupled to said processor-based receiver, said storage storing instructions that enable the extraction, from enhanced television content received by said receiver, of an announcement for said enhanced television content, said announcement including a session identifier having a unique value announcing the availability of an electronic programming guide.

25. The system of claim 24 wherein said storage stores instructions that enable the extraction of a value corresponding to the number 2208988800.

\* \* \* \* \*